(12) United States Patent
Lee (10) Patent No.: US 8,300,970 B2
(45) Date of Patent: Oct. 30, 2012

(54) METHOD FOR VIDEO ENHANCEMENT AND COMPUTER DEVICE USING THE METHOD

(75) Inventor: Kual-Zheng Lee, Jiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 876 days.

(21) Appl. No.: 12/402,468

(22) Filed: Mar. 11, 2009

(65) Prior Publication Data

US 2010/0067815 A1 Mar. 18, 2010

(30) Foreign Application Priority Data

Sep. 18, 2008 (TW) ................................ 97135774 A (51) Int. Cl.
*G06K 9/40* (2006.01)
(52) U.S. Cl. ......... 382/255; 382/254; 382/298; 382/300
(58) Field of Classification Search .................. 382/298, 382/254, 300
See application file for complete search history.

(56) References Cited

U.S. PATENT DOCUMENTS

| | | | | |
|---|---|---|---|---|
| 5,574,572 | A * | 11/1996 | Malinowski et al. | 358/451 |
| 5,991,456 | A | 11/1999 | Rahman et al. | |
| 7,003,153 | B1 | 2/2006 | Kerofsky | |
| 7,119,836 | B2 * | 10/2006 | Silverbrook | 348/207.2 |
| 7,119,837 | B2 | 10/2006 | Soupliotis et al. | |
| 2002/0071486 | A1 * | 6/2002 | Van Der Schaar et al. | 375/240.01 |
| 2002/0176010 | A1 | 11/2002 | Wallach et al. | |
| 2003/0103158 | A1 | 6/2003 | Barkan et al. | |
| 2004/0028292 | A1 * | 2/2004 | Alm et al. | 382/298 |
| 2006/0153287 | A1 | 7/2006 | Shen | |
| 2006/0233463 | A1 * | 10/2006 | Wright | 382/298 |
| 2006/0257042 | A1 | 11/2006 | Ofek et al. | |
| 2008/0018660 | A1 * | 1/2008 | Nenonen et al. | 345/596 |
| 2009/0040364 | A1 * | 2/2009 | Rubner | 348/362 |

FOREIGN PATENT DOCUMENTS

| | | | |
|---|---|---|---|
| EP | 1 418 544 A1 | | 5/2004 |
| WO | WO 2007/017835 A2 | | 2/2007 |
| WO | WO2007017835 | * | 2/2007 |

OTHER PUBLICATIONS

R.C. Gonzalez et al. "Digital Image Processing (2nd Ed)", NJ: Prentice Hall, pp. 75-146, 2001, US.
H. Kaiqia et al. "Image Enhancement Based on the Statistics of Visual Representation", Image adn Vision Computing, vol. 23, pp. 51-57, Jan. 2005 Elsevier Science Ltd., US.
Li Tao et al. "An Integrated Neighborhood Dependent Approach for Nonlinear Enhancement of Color Images", Proceeding of the International Conference on Information Technology: Coding and Computing, pp. 138-139, 2004 IEEE, US.

(Continued)

*Primary Examiner* — Jayesh A Patel (57) ABSTRACT

A video enhancement method is disclosed. An input image is retrieved and it is determined whether an enhancement mode is implemented to the input image. If so, motion detection is implemented to the input image that only enhancement coefficients of varied pixels of the input image are recalculated and the enhancement coefficients are updated to an enhancement coefficient table. Based on the enhancement coefficient table, pixel colors of the input image are adjusted and the adjusted image is output.

21 Claims, 5 Drawing Sheets

OTHER PUBLICATIONS

Saibabu Arigela et al. "An Adaptive and Non Linear Technique for Enhancement of Extremely High Contrast Images", 35th Applied Imagery and Pattern Recognition Workshop, 6 pages, IEEE 2006, US.

Daniel J. Jobson et al. "Properties and Performance of a Center/Surround Retinex", IEEE Transactions of Image Processing, vol. 6, No. 3, pp. 451-462, Mar. 1997, US.

Daniel J. Jobson et al. "A Multiscale Retinex for Bridging the Gap Between Color Images and the Human Observation of Scenes", IEEE Transactions of Image Processing, vol. 6, No. 7, pp. 965-976, Jul. 1997, US.

Srinivasa G. Narasimhan et al. "Contrast Restoration of Weather Degraded Images ", IEEE Transactions on Pattern Analysis and Machine Intelligence, vol. 25, No. 6, pp. 713-724, Jun. 2003, US.

Robby T. Tan et al. "Visibility Enhancement for Roads with Foggy or Hazy Scenes", Proceedings of the 2007 IEEE Intelligent Vehicles Symposium, pp. 19-24, Jun. 13-15, 2007, Istanbul, Turkey, 2007.

Jing Li et al. "Color Based Grayscale-fused Image Enhancement Algorithm for Video Surveillance", Proceedings of the Third International Conference on Image and Graphics, pp. 47-50, 2004, US.

Yinghao Cai et al. "Context Enhancement of Nighttime Survillance by Image Fusion", Proceedings of the 18$^{th}$ International Conference on Pattern Recognition, pp. 980-983, 2006, IEEE, US.

Luca Bogoni et al. "Pattern-Selective Color Image Fusion", Pattern Recognition 34, pp. 1515-1526, 2001 Elsevier Science Ltd., US.

Jacinto C. Nascimento et al. "Performance Evalutation of Object Detection Algorithms for Video Survillance", IEEE Transactions on Multimedia, pp. 761-774, vol. 8, No. 4, Aug. 2006, US.

Taiwan Patent Office, Office Action, Patent Application Serial No. 097135774, Jun. 27, 2012, Taiwan.

* cited by examiner

| 0.0125 | 0.0264 | 0.0339 | 0.0264 | 0.0125 |
|---|---|---|---|---|
| 0.0264 | 0.0559 | 0.0718 | 0.0559 | 0.0264 |
| 0.0339 | 0.0718 | 0.0922 | 0.0718 | 0.0339 |
| 0.0264 | 0.0559 | 0.0718 | 0.0559 | 0.0264 |
| 0.0125 | 0.0264 | 0.0339 | 0.0264 | 0.0125 |

METHOD FOR VIDEO ENHANCEMENT AND COMPUTER DEVICE USING THE METHOD

BACKGROUND OF THE INVENTION

1. Field of the Invention

The invention relates to a video processing method, and more particularly to a method for video enhancement.

2. Description of the Related Art

Digital video monitoring has become an important object based on development of the science and increment of requirements for public security maintenance. A video camera is installed with a video enhancement module to enhance video quality, processing brightness, saturation, noise, or edge features to picture clear frames under a dark, dense, or defocusing environment.

Prior video enhancement methods consider pictured frames as respective independent images so quality of the respective images can be improved. A single image can be enhanced using a global enhancement method or a local enhancement method. The global enhancement method sets a color conversion function, which is user-defined or implemented using a statistical method, and adjusts colors of each pixel of the image using the color conversion function. Common global enhancement methods comprise Contrast Stretch, Histogram Equalization, and so on. The local enhancement method determines enhancement degrees of respective pixels of an image based on local features of the image. Additionally, distances of the depth of field of respective pixels of the image can be predicted based on pixel units and colors of each pixel are compensated using an optical model.

The global enhancement method is capable of rapidly operating, saving memory space, and being easily to be implemented but does not provide features of a local region, such that over-enhancement or unacceptable quality of the local region. The local enhancement method can result in applicable effects but consume large operation resources due to greatly accessing local pixels or calculating enhancement coefficients by multiplication/division or logarithm. Recently, known video technology improves quality of video enhancement using multiple images but accelerative processing is less developed.

With respect to the development of vide applications, the global enhancement method providing low amount of operation has been widely applied, such as auto white balance (AWB) used in a video camera. In order to handle growing requirements for video hardware and software, a method for effective and rapid video enhancement is desirable.

With respect to video monitoring applications, video capture equipment (such as a video camera) generally takes specified scenes at a static or periodically dynamic state. Some conventional video enhancement methods independently process respective images (frames) and does not consider the temporal similarity of an image, such that enhancement coefficients of static regions of the image is re-calculated. Thus, technology for combining multiple images to enhance video quality has been disclosed but reducing operational complexity seems not to be discussed.

Additionally, prior calculation processes of enhancement coefficients indicate the bottleneck of the local enhancement method and, however, can be improved to substantially reduce operation amount of the video enhancement.

BRIEF SUMMARY OF THE INVENTION

An object of the invention provides a method for video enhancement based on temporal and spatial characteristics, simultaneously achieving video quality and rapid operation efficiency according to temporal and spatial similarity.

Methods for video enhancement are provided. An exemplary embodiment of a method for video enhancement comprises the following. An input image is retrieved. It is determined whether a full enhancement mode or a fast enhancement mode is implemented to the input image. Motion detection is implemented to the input image, if the fast enhancement mode is implemented, that only enhancement coefficients of varied pixels of the input image are recalculated and the enhancement coefficients are updated to an enhancement coefficient table. Pixel colors of the input image are adjusted based on the enhancement coefficient table and the adjusted image is outputted.

The method further calculates the enhancement coefficients of all pixels of the input image if the full enhancement mode is performed and updates the enhancement coefficients to the enhancement coefficient table.

The method further implements a downscaling operation to the input image and the downscaling operation is performed by averaging, nearest neighboring, or interpolating.

Further, the determination of the enhancement mode further sets a period parameter, determines whether a count value for a counter is greater than or equal to the period parameter, switches to the fast enhancement mode, if the count value is less than the period parameter, and accumulating the counter, and outputs the enhancement mode.

Further, the full enhancement mode is performed whenever an image number corresponding to the period parameter is reached.

Further, stable pixels of the input image are determined using the motion detection to reduce calculation frequency of the enhancement coefficients.

Further, the motion detection further detects varied states of each pixel of the input image, re-calculates and updating the enhancement coefficients of the varied pixels to the enhancement coefficient table, continues using the enhancement coefficients which are previously calculated of the stable pixels, and periodically re-calculates the enhancement coefficients of each pixel of the input image.

Computer devices are provided. An exemplary embodiment of a computer device comprises a video capture module, a determination module, a calculation module, and an adjustment module. The video capture module retrieves an input image. The determination module determines whether a full enhancement mode or a fast enhancement mode is implemented to the input image. The calculation module implements motion detection to the input image, if the fast enhancement mode is implemented, that only enhancement coefficients of varied pixels of the input image are recalculated and updates the enhancement coefficients to an enhancement coefficient table. The adjustment module adjusts pixel colors of the input image based on the enhancement coefficient table and outputs the adjusted image.

Further, the calculation module calculates the enhancement coefficients of the whole pixels of the input image if the full enhancement mode is performed and updates the enhancement coefficients to the enhancement coefficient table.

The computer device further comprises a downscaling module, implementing a downscaling operation to the input image.

Further, the downscaling operation is performed by averaging, nearest neighboring, or interpolating.

Further, the determination module setting a period parameter, determining whether a count value for a counter is greater than or equal to the period parameter, switching to the fast enhancement mode, if the count value is less than the period parameter, and accumulating the counter, and outputting the enhancement mode.

Further, the determination module determines to perform the full enhancement mode whenever an image number corresponding to the period parameter is reached.

Further, the determination module determines stable pixels of the input image using the motion detection to reduce calculation frequency of the enhancement coefficients.

Further, the calculation module further detects varied states of each pixel of the input image, re-calculates and updating the enhancement coefficients of the varied pixels to the enhancement coefficient table, continues using the enhancement coefficients which are previously calculated of the stable pixels, and periodically re-calculates the enhancement coefficients of each pixel of the input image.

A computer-readable medium is further provided. The computer-readable medium is encoded with computer executable instructions for performing a method for video enhancement. The computer executable instructions comprise retrieved an input image, determining whether a full enhancement mode or a fast enhancement is implemented to the input image, implementing motion detection to the input image, if the fast enhancement mode is implemented, that only enhancement coefficients of varied pixels of the input image are recalculated and updating the enhancement coefficients to an enhancement coefficient table, and adjusting pixel colors of the input image based on the enhancement coefficient table and outputting the adjusted image.

Further, the computer executable instructions comprise calculating the enhancement coefficients of the whole pixels of the input image if the full enhancement mode is performed and updating the enhancement coefficients to the enhancement coefficient table.

Further, the computer executable instructions comprise implementing a downscaling operation to the input image.

Further, the computer executable instructions comprise setting a period parameter, determining whether a count value for a counter is greater than or equal to the period parameter, switching to the fast enhancement mode, if the count value is less than the period parameter, and accumulating the counter, and outputting the enhancement mode.

Further, the computer executable instructions comprise performing the full enhancement mode whenever an image number corresponding to the period parameter is reached.

Further, the computer executable instructions comprise determining stable pixels of the input image using the motion detection to reduce calculation frequency of the enhancement coefficients.

Further, the computer executable instructions comprise detecting varied states of each pixel of the input image, re-calculating and updating the enhancement coefficients of the varied pixels to the enhancement coefficient table, continuing using the enhancement coefficients which are previously calculated of the stable pixels, and periodically re-calculating the enhancement coefficients of each pixel of the input image.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 5, which generally relate to video enhancement. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method for video enhancement. An embodiment of the method for video enhancement simultaneously achieves video quality and rapid operation efficiency according to temporal and spatial similarity.

A downscaling operation is first performed using the spatial similarity to approach enhancement coefficients of each pixel of an image. Next, motion detection with low operation amount is performed to the image based on the temporal similarity and it is determined to continue using the enhancement coefficients of the image based on varied states of each pixel or re-calculate the enhancement coefficients of the image with ignoring static pixels, maintaining video enhancement quality and reducing the operation amount.

Figure 1:
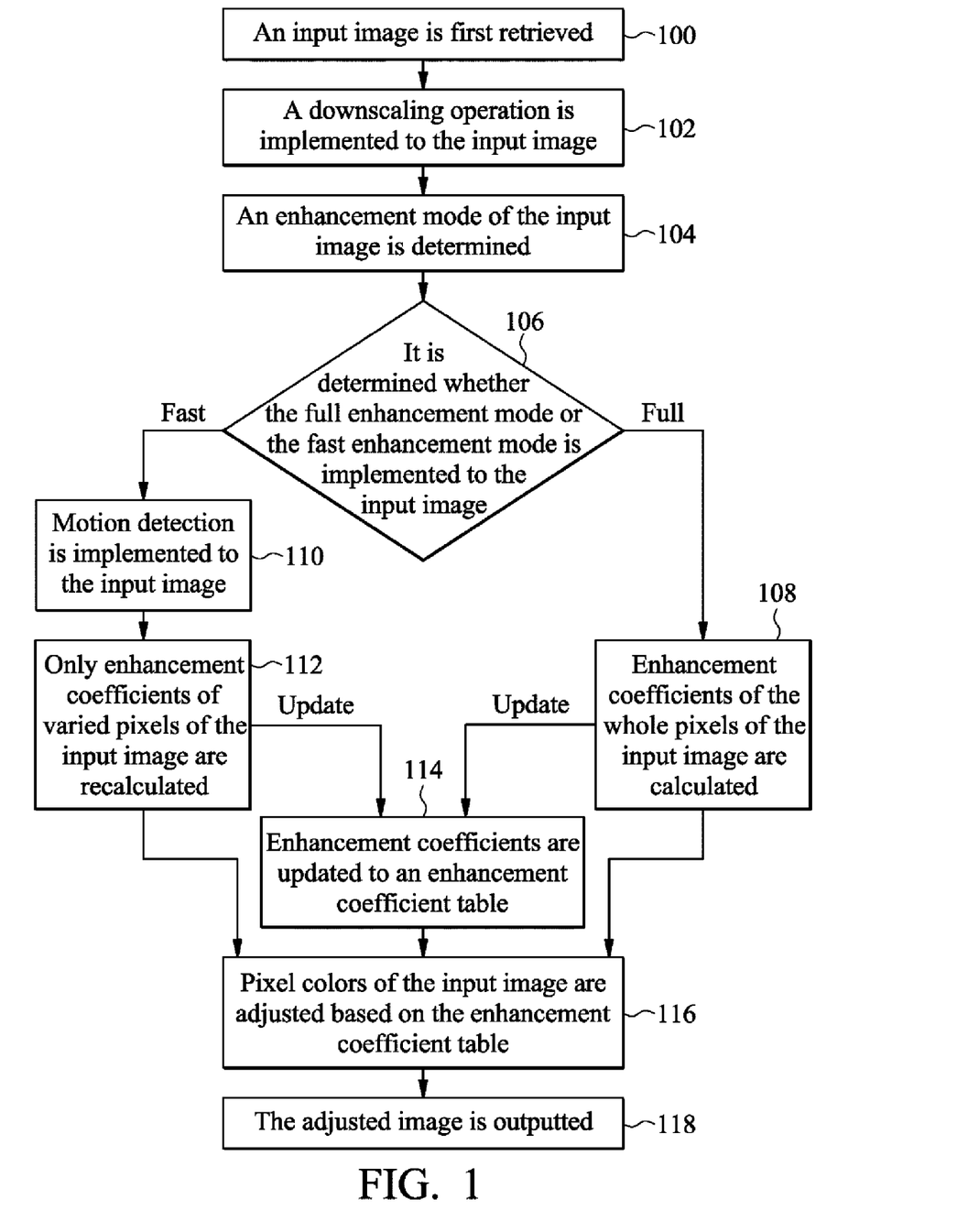
FIG. 1 is a flowchart of a method for video enhancement of the present invention.

FIG. 1 is a flowchart of a method for video enhancement of the present invention.

An input image is first retrieved (step S100) and a downscaling operation is implemented to the input image (step S102). An enhancement mode of the input image is determined (step S104), comprising a full enhancement mode or a fast enhancement mode. It is determined whether the full enhancement mode or the fast enhancement mode is implemented to the input image (step S106). Enhancement coefficients of the whole pixels of the input image are calculated if the full enhancement mode is performed (step S108) and the enhancement coefficients are updated to an enhancement coefficient table (step S114). Motion detection is implemented to the input image (step S110), if the fast enhancement mode is implemented, that only enhancement coefficients of varied pixels of the input image are recalculated (step S112) and the enhancement coefficients are updated to the enhancement coefficient table (step S114). Pixel colors of the input image are adjusted based on the enhancement coefficient table (step S116) and the adjusted image is outputted (step S118).

An embodiment of the method for video enhancement can be implemented with applying other local enhancement methods, such as the INDANE mechanism. Additionally, a grayscale image with 8 bits and a RGB color image with 24 bits are applied in this embodiment for simplification, which is not to be limitative.

The downscaling operation of the step S102 is further described in the following.

Figure 2:
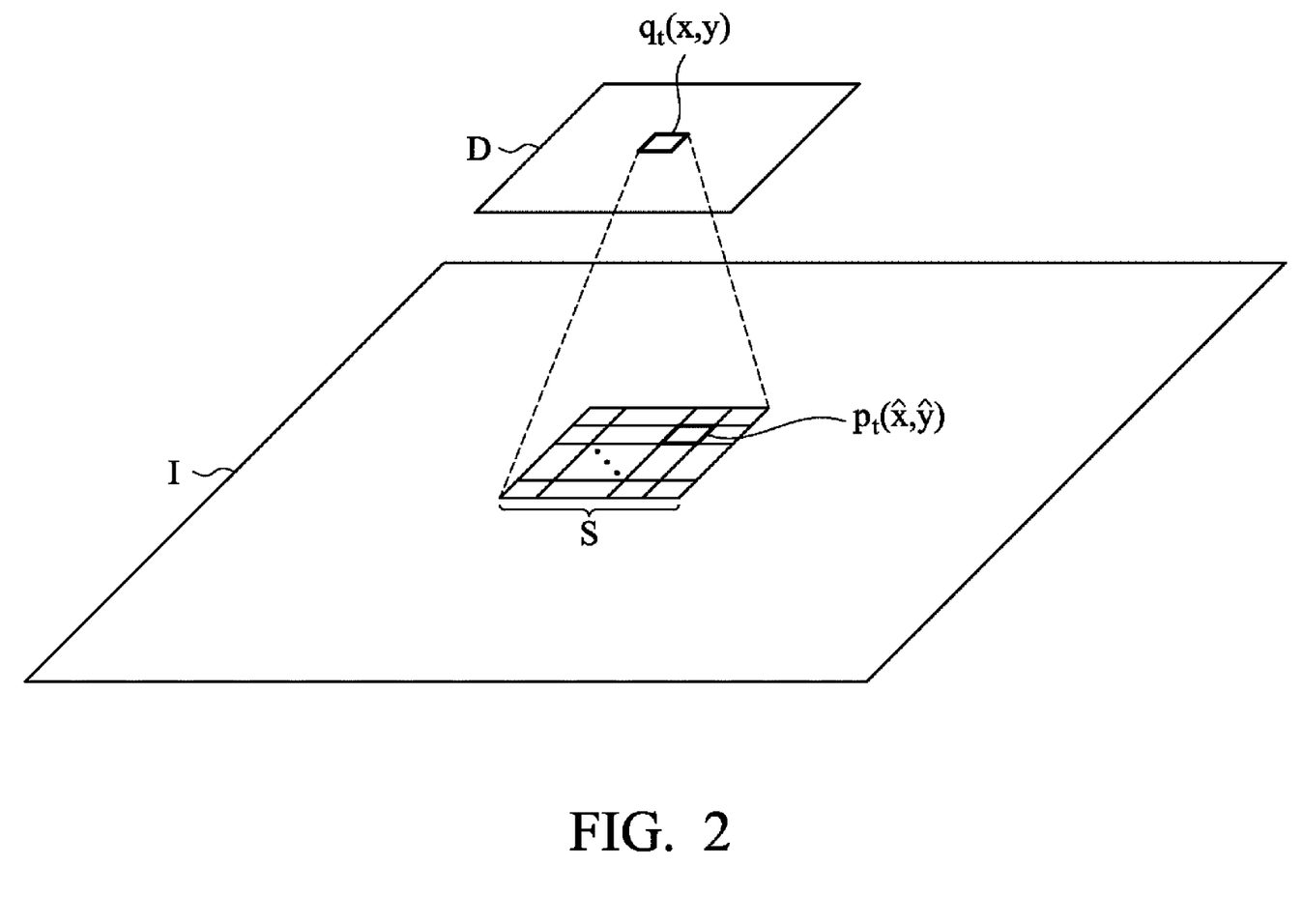
FIG. 2 is a schematic view of the downscaling operation of the present invention.

Since enhancement coefficients of neighboring pixels of the input image are similar to each other, the operation amount for the enhancement coefficients can be reduced using the downscaling operation. FIG. 2 is a schematic view of the downscaling operation of the present invention, in which the input image is provided by M×N. When the t-th image indicates I, $p_t$ represents a pixel of the image I with coordinate $(\hat{x}, \hat{y})$. The pixel $p_t$ is downscaled and corresponded to a pixel $q_t$ of the downscaled image D with coordinate (x, y).

When a sampling operation is performed, x represents a pixel of the input image, $L(x) \in [0, 255]$ represents a grayscale value of the pixel x, $L_n(x) \in [0, 1]$ represents a normalized grayscale value of the pixel x, and $B(x, j) \in [0, 255]$ represents a color value ($j \in \{r, g, b\}$) with the pixel x comprising a color channel j. Next, a downscaling magnification s is set so the downscaled image D is represented by $$\frac{M}{s} \times \frac{N}{s}.$$

The downscaling operation can be performed using functions represented by:

$$L(q_t) = \frac{1}{s \times s} \sum_{x=sx}^{sx+s-1} \sum_{y=sy}^{sy+s-1} L(p_t). \qquad \text{formula (1)}$$

Further, the downscaling operation can be performed by a nearest neighboring, represented by:

$$L(q_t) = L(p_t),$$

where $\hat{x} = sx$ and $\hat{y} = sy$. formula (2)

Further, the downscaling operation can be performed by interpolating.

The downscaling operation can also be applied to obtain color values. Referring to the INDANE mechanism disclosed by Tao and Asari, only the grayscale values should be processed using the downscaling operation. The downscaling magnification s is determined based on the size of the input image and enhancement quality. For rapid processing and keeping the enhancement quality, the downscaling magnification s is assigned by 2 and the downscaling operation is performed.

Determining the enhancement mode of the step S104 is further described in the following.

Figure 3:
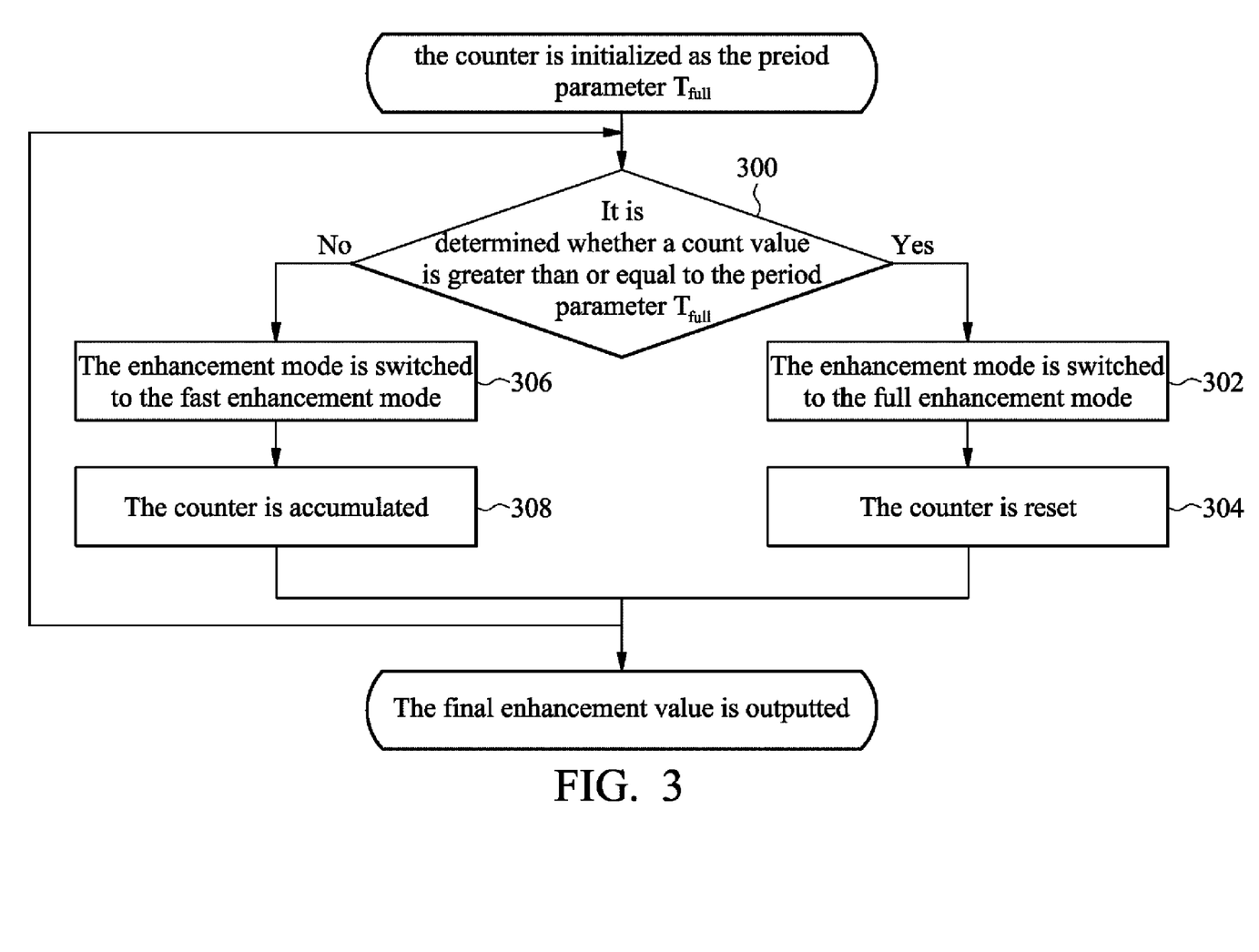
FIG. 3 is a flowchart of determining an enhancement of the present invention.

The method periodically updates the enhancement coefficients of the pixels of the input image using the full and fast enhancement modes for achieving desired video quality. FIG. 3 is a flowchart of determining an enhancement of the present invention. A period parameter $T_{full}$ is first set, a counter is defined (the counter is initialized as $T_{full}$), and it is determined whether a count value from the counter is greater than or equal to the period parameter $T_{full}$ (step S300). The enhancement mode is switched to the full enhancement mode if the count value is greater than or equal to the period parameter $T_{full}$ (step S302), and the counter is reset (Counter 1) (step S104). The enhancement mode is switched to the fast enhancement mode if the count value is less than the period parameter $T_{full}$ (step S306), the counter is accumulated (Counter Counter 1) (step S308), and the final enhancement mode is outputted.

Briefly, the determination process for a complete video enhancement is fixedly performed whenever $T_{full}$ images are retrieved.

The motion detection of the step S110 is further described in the following.

The motion detection determines varied states of each pixel of the input image that calculates color differences between neighboring images and discriminates varied states between the pixels according to predefined threshold values. The method detects varied states of the pixels using a background subtraction and extraction method that $M(q_t)$ represents a varied state at time t of the pixel $q_t$ on the downscaled image D. The varied state is calculated using the function represented as:

$$M(q_t) = \begin{cases} 0, & \text{if } |L(q_t) - L(q_{t-\delta})| \leq T_{motion} \\ 1, & \text{else,} \end{cases} \qquad \text{formula (3)}$$

where $T_{motion}$ represents a threshold value ($\leq 20$, for example) for determining the varied state (i.e. a sensitive value for motion detection) and $\delta$ represents a period parameter (30, for example) for background sampling. $M(q_t)$ can be processed using erosion and dilation of morphology for promoting detection effect.

The calculation of the enhancement coefficients is further described in the following.

The enhancement coefficients are used for adjusting the color of each pixel, which act as an important role of the video enhancement. The local enhancement method usually applies convolution with Gaussian weights to retrieve local information around the pixel $q_t$ and calculates the enhancement coefficients according to a color ratio of the pixel $q_t$ to the surrounding pixels. Alternatively, information of the depth of field of the pixel $q_t$ can be estimated to calculate the enhancement coefficients.

The INDANE mechanism is used as an example, while N Gaussian weights are applied to obtain better enhancement effect. The good enhancement effect can be generated when N=3. The i-th Gaussian weight is calculated using a function represented by:

$$G_i(m, n) = K \times e^{\left(\frac{-(m^2+n^2)}{C_i}\right)}, i = 1, 2, \ldots, N, \qquad \text{formula (4)}$$

where $C_i$ represents the size of a surrounding area and K is used to normalize the weight, which corresponds to a function represented by:

$$\int \int K \times e^{\left(\frac{-(m^2+n^2)}{C_i}\right)} dm dn = 1. \qquad \text{formula (5)}$$

The i-th convolution of the pixel $q_t (V_i \in [0, 255])$ is calculated according to the Gaussian weight, represented by:

$$V_i(q_t) = \sum_{m=-C_i}^{C_i} \sum_{n=-C_i}^{C_i} L(q'_t) \times G_i(m, n), \qquad \text{formula (6)}$$

where $q'_t$ represents a pixel neighboring to the pixel $q_t$ with coordinate (x+m, y+n).

Figure 4A:
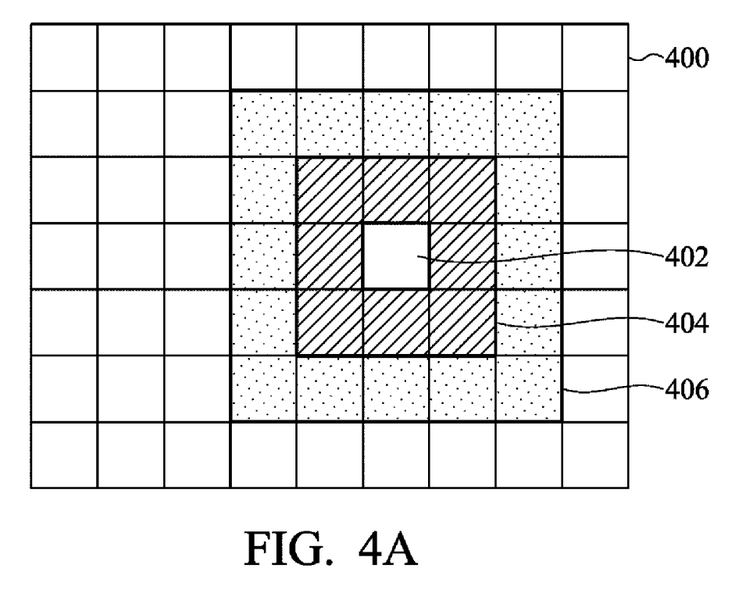
FIG. 4A is a schematic view of a convolution operation of the present invention.

FIG. 4A is a schematic view of convolution operation of the present invention.

Figure 4B:
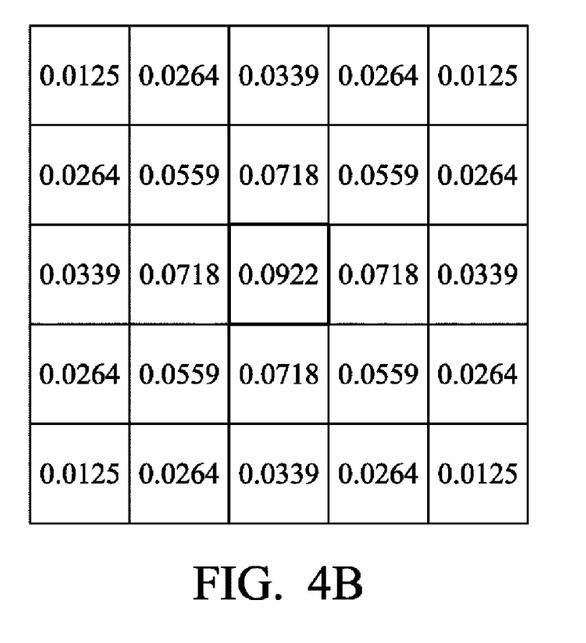
FIG. 4B is a schematic view of Gaussian weights of the present invention.

Region sizes of multiple convolutions are set around a pixel 402 of an input image 400. The parameter $C_i=1$ corresponds to a region 404 with 3×3 size, for example, while the parameter $C_i=2$ corresponds to a region 404 with 5×5 size. The Gaussian weight for $C_i=2$ is shown in FIG. 4B.

When the convolution operation has been finished, a conversion function for the pixel $q_t$ on the downscaled image D is created to adjust pixel brightness, which can be represented as:

$$L'_n(q_t) = \frac{L_n(q_t)^{0.24} + (1 - L_n(q_t)) \times 0.5 + L_n(q_t)^2}{2}. \quad \text{formula (7)}$$

Examples for converting the pixel x using the formula (7) are described, comprising [L(x),L'(x),L'$_n$(x),255×L'$_n$(x)]=[0, 0, 0.250, 63.750], [16, 0.063, 0.494, 125.856], [64, 0.251, 0.578, 147.282], [128, 0.502, 0.674, 171.937], and [255, 1, 1, 255], substantially promoting grayscale values of dark pixels.

The i-th grayscale ratio $r_i$ of a surrounding region relating to the pixel $q_t$ is calculated using a function represented by:

$$r_i(q_t) = \frac{V_i(q_t)}{L(q_t)}. \quad \text{formula (8)}$$

The i-th enhancement coefficient of the pixel $q_t$ can be further calculated based on the grayscale ratio using a function represented by:

$$R_i(q_t) = 255 \times L'_n(q_t)^{r_i(q_t)} \quad \text{formula (9).}$$

Finally, each enhancement coefficient is accumulated by weighting to generate the final enhancement coefficient of the pixel $q_t$, the weighting represented by:

$$R(q_t) = \sum_{i=1}^{N} w_i \times R_i(q_t) \text{ where } \sum_{i=1}^{N} w_i = 1, \quad \text{formula (10)}$$

where $w_1$ represents the weight for the enhancement coefficient. In this embodiment, $w_1=w_2=w_3=\frac{1}{3}$.

Referring to FIG. 1, when the enhancement mode is determined, the motion detection is performed if the fast enhancement mode is selected, the convolution operation is implemented to varied pixels using the formula (6) and enhancement coefficients of the varied pixels are calculated using the formula (10), and the enhancement coefficients are updated to the enhancement coefficient table. The enhancement coefficients of stable pixels are continuously used based on a function represented by:

$$R(q_t) = R(q_{t-1}) \text{ if } M(q_t) \neq 1 \quad \text{formula (11).}$$

The color adjustment of the step S116 is further described in the following.

When the enhancement coefficients of the downscaled image D have been calculated, the enhancement coefficients are applied to each of the pixels of the image, thereby completing the enhancement process. Referring to the INDANE mechanism, a R/G/B color number $B(p_t, j)$ of the pixel $p_t$ on the image I is given and the pixel $p_t$ corresponds the pixel $q_t$ of the downscaled image D, so the color of the pixel $p_t$ can be adjusted using a function represented by:

$$B(p_t, j) = R(q_t) \times \frac{B(p_t, j)}{L(q_t)} \times \lambda_j, \quad j \in \{r, g, b\}, \quad \text{formula (12)}$$

where $\lambda_j$ represents a parameter for adjusting color difference. In this embodiment, $\lambda_R = \lambda_G = \lambda_B = 1$.

Figure 5:
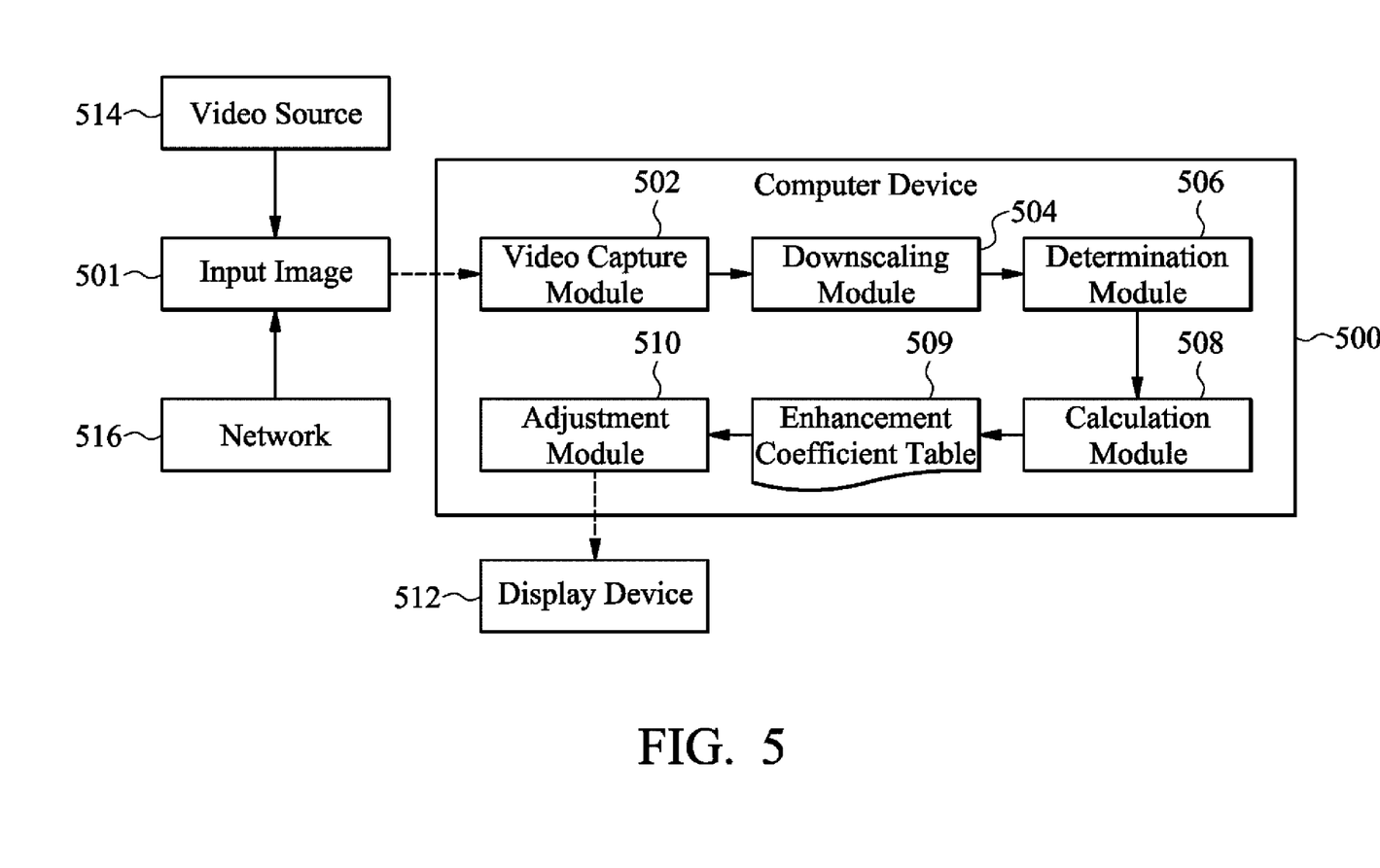
FIG. 5 is a schematic view of a computer device of the present invention.

FIG. 5 is a schematic view of a computer device of the present invention.

An embodiment of the computer device 500 comprises a video capture module 502, a downscaling module 504, a determination module 506, a calculation module 508, and an adjustment module 510. The video capture module 502 retrieves an input image 501. The downscaling module 504 implements a downscaling operation to the input image 501. The determination module 506 determines whether a full enhancement mode or a fast enhancement mode is implemented to the input image 501. The calculation module 508 calculates enhancement coefficients of all pixels of the input image 501 if the full enhancement mode is performed and updates the enhancement coefficients to an enhancement coefficient table 509.

Further, the calculation module 508 implements motion detection to the input image 501, if the fast enhancement mode is implemented, that only enhancement coefficients of varied pixels of the input image 501 are recalculated and updates the enhancement coefficients to the enhancement coefficient table 509. The adjustment module 510 adjusts colors of the pixels of the input image 501 based on the enhancement coefficient table 509 and outputs the adjusted image to a display device 512 (such as a monitor).

The input image 501 can be retrieved from a video source 514 or via network 516.

An embodiment of the method for video enhancement simultaneously achieves video quality and rapid operation efficiency according to temporal and spatial similarity, substantially reducing operation amount of the video enhancement.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for video enhancement, comprising:
retrieving an input image;
determining whether a full enhancement mode or a fast enhancement mode is implemented to the input image by the following steps, wherein the full enhancement mode processes all pixels of the input image, and the fast enhancement mode processes varied pixels of the input image:
setting a period parameter;
determining whether a count value for a counter is greater than or equal to the period parameter;
when the count value is less than the period parameter, switching to the fast enhancement mode and accumulating the counter; and
when the count value is not less than the period parameter, switching to the full enhancement mode and resetting the counter; and
when the fast enhancement mode is determined to be implemented, implementing motion detection for the input image, in which enhancement coefficients of varied pixels of the input image are recalculated and updating the enhancement coefficients to an enhancement coefficient table; and
adjusting pixel colors of the input image based on the enhancement coefficient table and outputting the adjusted image.

2. The method for video enhancement as claimed in claim 1, further comprising:
when the full enhancement mode is determined to be implemented, calculating the enhancement coefficients of all pixels of the input image; and
updating the enhancement coefficients to the enhancement coefficient table.

3. The method for video enhancement as claimed in claim 2, further comprising implementing a downscaling operation to the input image.

4. The method for video enhancement as claimed in claim 3, wherein the downscaling operation is performed by averaging, nearest neighboring, or interpolating.

5. The method for video enhancement as claimed in claim 1, wherein the full enhancement mode is performed whenever an image number corresponding to the period parameter is reached.

6. The method for video enhancement as claimed in claim 1, wherein stable pixels of the input image are determined using the motion detection to reduce calculation frequency of the enhancement coefficients.

7. The method for video enhancement as claimed in claim 6, wherein the motion detection further comprises:
detecting varied states of each pixel of the input image;
re-calculating and updating the enhancement coefficients of the varied pixels to the enhancement coefficient table;
continuing using the enhancement coefficients which are previously calculated of the stable pixels; and
periodically re-calculating the enhancement coefficients of each pixel of the input image.

8. A computer device, comprising:
a video capture module, retrieving an input image;
a determination module, determining whether a full enhancement mode or a fast enhancement mode is implemented to the input image by the following steps, wherein the full enhancement mode processes all pixels of the input image, and the fast enhancement mode processes varied pixels of the input image:
setting a period parameter;
determining whether a count value for a counter is greater than or equal to the period parameter;
when the count value is less than the period parameter, switching to the fast enhancement mode and accumulating the counter; and
when the count value is not less than the period parameter, switching to the full enhancement mode and resetting the counter; and
a calculation module, when the fast enhancement mode is determined to be implemented, implementing motion detection for the input image, in which enhancement coefficients of varied pixels of the input image are recalculated and updating the enhancement coefficients to an enhancement coefficient table; and
an adjustment module, adjusting pixel colors of the input image based on the enhancement coefficient table and outputting the adjusted image.

9. The computer device as claimed in claim 8, wherein, when the full enhancement mode is determined to be implemented, the calculation module calculates the enhancement coefficients of the whole pixels of the input image and updates the enhancement coefficients to the enhancement coefficient table.

10. The computer device as claimed in claim 9, further comprising a downscaling module, implementing a downscaling operation to the input image.

11. The computer device as claimed in claim 10, wherein the downscaling operation is performed by averaging, nearest neighboring, or interpolating.

12. The computer device as claimed in claim 8, wherein the determination module determines to perform the full enhancement mode whenever an image number corresponding to the period parameter is reached.

13. The computer device as claimed in claim 8, wherein the determination module determines stable pixels of the input image using the motion detection to reduce calculation frequency of the enhancement coefficients.

14. The computer device as claimed in claim 13, wherein the calculation module further detects varied states of each pixel of the input image, re-calculates and updating the enhancement coefficients of the varied pixels to the enhancement coefficient table, continues using the enhancement coefficients which are previously calculated of the stable pixels, and periodically re-calculates the enhancement coefficients of each pixel of the input image.

15. A non-transitory computer-readable medium encoded with computer executable instructions for performing a method for video enhancement, the computer executable instructions comprising:
retrieving an input image;
determining whether a full enhancement mode or a fast enhancement mode is implemented to the input image by the following steps, wherein the full enhancement mode processes all pixels of the input image, and the fast enhancement mode processes varied pixels of the input image:
setting a period parameter;
determining whether a count value for a counter is greater than or equal to the period parameter; when the count value is less than the period parameter, switching to the fast enhancement mode and accumulating the counter; and
when the count value is not less than the period parameter, switching to the full enhancement mode and resetting the counter;

when the fast enhancement mode is determined to be implemented, implementing motion detection for the input image, in which enhancement coefficients of varied pixels of the input image are recalculated and updating the enhancement coefficients to an enhancement coefficient table; and adjusting pixel colors of the input image based on the enhancement coefficient table and outputting the adjusted image.

16. The non-transitory computer-readable medium as claimed in claim 15, further comprising:

when the full enhancement mode is determined to be implemented, calculating the enhancement coefficients of all pixels of the input image; and updating the enhancement coefficients to the enhancement coefficient table.

17. The non-transitory computer-readable medium as claimed in claim 16, further comprising implementing a downscaling operation to the input image.

18. The non-transitory computer-readable medium as claimed in claim 17, wherein the downscaling operation is performed by averaging, nearest neighboring, or interpolating.

19. The non-transitory computer-readable medium as claimed in claim 15, wherein the full enhancement mode is performed whenever an image number corresponding to the period parameter is reached.

20. The non-transitory computer-readable medium as claimed in claim 15, wherein stable pixels of the input image are determined using the motion detection to reduce calculation frequency of the enhancement coefficients.

21. The non-transitory computer-readable medium as claimed in claim 20, wherein the motion detection further comprises:

detecting varied states of each pixel of the input image;

re-calculating and updating the enhancement coefficients of the varied pixels to the enhancement coefficient table;

continuing using the enhancement coefficients which are previously calculated of the stable pixels; and periodically re-calculating the enhancement coefficients of each pixel of the input image.

* * * * *